United States Patent
Jurng et al.

(10) Patent No.: US 10,113,126 B2
(45) Date of Patent: Oct. 30, 2018

(54) REUSABLE POLYMERIC MATERIAL FOR REMOVING SILOXANE COMPOUNDS IN BIOGAS, METHOD THEREBY AND APPARATUS THEREFOR

(71) Applicant: KOREA INSTITUTE OF SCIENCE AND TECHNOLOGY, Seoul (KR)

(72) Inventors: Jong Soo Jurng, Seoul (KR); Hyoun Duk Jung, Seoul (KR); Min Su Kim, Seoul (KR); Eun Seuk Park, Seoul (KR); Young Haeng Lee, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 76 days.

(21) Appl. No.: 15/292,214

(22) Filed: Oct. 13, 2016

(65) Prior Publication Data

US 2017/0226437 A1    Aug. 10, 2017

(30) Foreign Application Priority Data

Feb. 4, 2016 (KR) .......................... 10-2016-0014402

(51) Int. Cl.
| | |
|---|---|
| *C10L 3/10* | (2006.01) |
| *B01D 53/04* | (2006.01) |
| *B01J 20/26* | (2006.01) |
| *B01J 20/30* | (2006.01) |
| *B01J 20/32* | (2006.01) |

(52) U.S. Cl.
CPC ............ *C10L 3/101* (2013.01); *B01D 53/04* (2013.01); *B01D 53/0438* (2013.01); *B01J 20/262* (2013.01); *B01J 20/3085* (2013.01); *B01J 20/3231* (2013.01); *B01J 20/3295* (2013.01); *B01D 2253/202* (2013.01); *B01D 2253/302* (2013.01); *B01D 2256/245* (2013.01); *B01D 2257/556* (2013.01); *B01D 2259/40088* (2013.01); *C10L 2290/542* (2013.01)

(58) Field of Classification Search
CPC ................................. C10J 3/00–3/86
See application file for complete search history.

(56) References Cited

U.S. PATENT DOCUMENTS

| | | | |
|---|---|---|---|
| 7,306,652 B2 | 12/2007 | Higgins | |
| 2008/0026267 A1* | 1/2008 | Rikihisa | .................. C10L 7/02 44/265 |

(Continued)

FOREIGN PATENT DOCUMENTS

| | | |
|---|---|---|
| JP | 2009-183900 | 8/2009 |
| KR | 10-0652903 | 12/2006 |

(Continued)

*Primary Examiner* — Matthew J Merkling
(74) *Attorney, Agent, or Firm* — Perkins IP Law Group LLC; Jefferson Perkins

(57) ABSTRACT

Provided are a reusable polymeric material for removing siloxane compounds in biogas, a method for removing siloxane using the same, and an apparatus therefor, and more particularly, a polyacrylate-based polymer absorbent for removing siloxane compounds in biogas and a method for removing siloxane compounds in biogas. The method for removing siloxane compounds in biogas includes (a) providing the biogas, and b) absorbing the siloxane compounds in a polymer absorbent by passing the biogas through the polymer absorbent according to any one of claims 1 to 5.

13 Claims, 2 Drawing Sheets

(56) References Cited

U.S. PATENT DOCUMENTS

| | | | | |
|---|---|---|---|---|
| 2008/0193647 A1* | 8/2008 | Saito | .................... | C09D 11/322 |
| | | | | 427/256 |
| 2013/0340616 A1* | 12/2013 | Iyer | .......................... | C10L 3/08 |
| | | | | 95/186 |
| 2014/0298992 A1* | 10/2014 | Carruthers | ............. | C12M 47/18 |
| | | | | 95/139 |
| 2017/0167334 A1* | 6/2017 | Williams | .............. | F01N 3/0233 |

FOREIGN PATENT DOCUMENTS

| | | |
|---|---|---|
| KR | 10-0964633 | 6/2010 |
| WO | 2006/045561 | 5/2006 |

* cited by examiner

REUSABLE POLYMERIC MATERIAL FOR REMOVING SILOXANE COMPOUNDS IN BIOGAS, METHOD THEREBY AND APPARATUS THEREFOR

CROSS-REFERENCE TO RELATED APPLICATIONS

This application claims the priority of Korean Patent Application No. 10-2016-0014402 filed on Feb. 4, 2016, in the Korean Intellectual Property Office, the disclosure of which is incorporated herein by reference.

BACKGROUND

Field

The present disclosure relates to a method of effectively and economically removing siloxane compounds as impurities in biogas and an apparatus therefor.

Description of the Related Art

Biogas means gas including methane as a main ingredient which is a representative reusable fuel obtained through an anaerobic process with a microorganism or a chemical process by using a biomass such as straw, corn, sugar cane, or wood waste or organic wastes such as food waste, muck, or sewage sludge.

When the biogas of which the use is increased as a reusable energy source to replace coal fuel is used as for example, a vehicle fuel, emission of carbon dioxide is lower as about 80% than a gasoline vehicle, and emission of microdust and emission of nitrogen compounds and exhaust gas are significantly low. Further, the biogas discharges carbon dioxide to a similar extent to natural gas having a similar component, but since the entire process of generating and destructing carbon dioxide is circulated in the natural system and carbon emission is neutral, a total emission of carbon dioxide may be largely reduced even as compared with any coal fuel which irreversibly emits carbon dioxide in the air. Accordingly, in order to solve the problem of global warming caused by greenhouse gas, according to Paris agreement established in accordance with the U.N. convention on climate change for reducing the carbon emission quantity, several developed countries including Korea which should rapidly reduce a carbon dioxide emission quantity pay so much attention to the development.

The generation and use of the biogas may use organic waste which is naturally generated together production of food resources without requiring additional efforts, and the biogas has advantages of an eco-friendly process obtaining an energy source from waste resources which are generated in Korea and tipped on the land or the sea to cause environmental problems and using a natural gas infrastructure such as power plants which have been already invested in a large scale due to a similar property to the natural gas without a large change. However, since impurities such as siloxane in the biogas may cause problems such as engine abrasion and the like during power generation of a gas turbine, techniques of efficiently removing the impurities need to be developed and thus, the biogas can be used as fuels for power generation or transportation.

As the method for removing siloxane in the biogas, for example, a technique of an absorbing method by impregnated activated carbon like a carbon-based activated carbon absorbent disclosed in Korea Patent Registration No. 10-0964633 has been developed, but a scale of an absorption tower processing facility by a method of holding an absorbent to be used per year is excessively increased and maintenance costs required for replacement of the absorbent and the like has a large effect on economics of the biogas.

In order to solve the general problems of the carbon-based activated carbon absorbent, for example, deformed silicagel disclosed in International Patent Application Publication No. 2006/045561 and absorption and desorption techniques using activated alumina disclosed in U.S. Pat. No. 7,306,652 have been developed. However, unlike a case of absorbing water, in the case of absorbing the siloxane compounds, there are disadvantages that the reproduction is not easy and the economics is deteriorated because heat reproduction equipment or reproduction gas is required for reproducing the silicagel.

Meanwhile, in the case of an absorbing product as a material capable of replacing the silicagel, techniques for a super absorbing polymer have been developed. A polymer compound such as poly(meth)acrylate illustrated in Japanese Patent Application Publication No. 2009-183900 is a polymeric material which is widely used as an absorbing product due to an excellent ability of absorbing water like the silicagel, but has a disadvantage that it is not effective to remove a silica component in the biogas by a continuous process.

In the present disclosure, an effective silicagel replacement material and a process thereof capable of removing a silica component in the biogas have been developed by applying a technique for a desiccant formed by mixing a super absorbing polymer and a salt disclosed in Korea Patent Registration No. 10-0652903 (Dec. 4, 2006) as an absorbing product.

SUMMARY

An object to be achieved by the present disclosure is to develop a new material absorbent which effectively removes siloxane compounds in biogas causing problems such as engine abrasion during power generation by a gas turbine and is easily reusable, and provide a method and an apparatus for removing using the same.

According to an aspect of the present disclosure, there is provided a poly(meth)acrylate salt-based polymer absorbent for removing siloxane compounds in biogas.

Herein, the polymer absorbent may be repetitively used through a desorption reproduction process of the siloxane compounds.

Further, the polymer absorbent may be prepared through ion exchange of sodium poly(meth)acrylate. More preferably, the sodium ions may be exchanged to lithium, potassium, magnesium or calcium so as to have more effective silica absorption.

Further, the polymer absorbent may be supported on a porous material. More preferably, the polymer absorbent may be supported on a honeycomb material.

In addition, when the siloxane concentration of the biogas is equal to or less than 200 ppm, a siloxane removal rate may be equal to or greater than 99%.

According to another aspect of the present disclosure, there is provided a method for removing siloxane compounds in biogas, comprising the steps of: (a) providing the biogas; and (b) absorbing the siloxane compounds in a polymer absorbent by passing the biogas through the polymer absorbent.

Herein, the absorbing step (b) may include absorbing the siloxane compounds in the polymer absorbent in a temperature range of 15 to 30° C.

The method for removing the siloxane compounds in the biogas may further include desorbing for reproducing the polymer absorbent in a temperature range of 60 to 100° C. after the step (b) or in parallel with the step (b).

According to yet another aspect of the present disclosure, there is provided an apparatus for removing siloxane compounds in biogas, comprising: (i) a biogas providing unit; and (ii) one or more absorbing units including the polymer absorbent.

Herein, the absorbing units may operate in an absorbing step in a temperature range of 15 to 30° C.

Further, the absorbing units may be constituted by two or more absorbing units.

Further, at least one of the absorbing units may operate in a step of desorbing the siloxane compounds absorbed in a temperature range of 60 to 100° C. in order to reproduce the polymer absorbent.

Further, the absorbing unit operating in the desorbing step may operate by using waste heat of an engine operating by biogas from which the siloxane compounds are removed.

Further, the apparatus for removing the siloxane compounds in the biogas may further include one or more units selected from a water removing unit, a sulfur compound removing unit, a nitride oxide removing unit, a pressing unit, a decompressing unit, and a particle filter unit.

According to the present disclosure, it is possible to improve performance of power generation equipment and energy recycling equipment by removing a small amount of siloxane gas which is a factor of deteriorating performance and durability of the power generation equipment and the energy recycling equipment in the biogas in a biogas purifying process.

It is possible to reduce generation of absorbent waste generated in the purifying process by recycling the material used in the process. As heating energy required for reproducing the absorbent in the purifying process, required energy is covered by using waste heat generated in a biogas plant.

It is possible to reduce heating energy or decompressing energy required when reproducing the absorbent by using a reusable absorption and desorption material in a low temperature range of 60 to 100° C. It is expected to contribute in development of reusable energy industry by increasing efficiency of a purifying process required for improving economics when producing the biogas.

The effects of the present disclosure are not limited to the aforementioned effects, and various other effects are included in the present specification.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE EMBODIMENT

Figure 1:
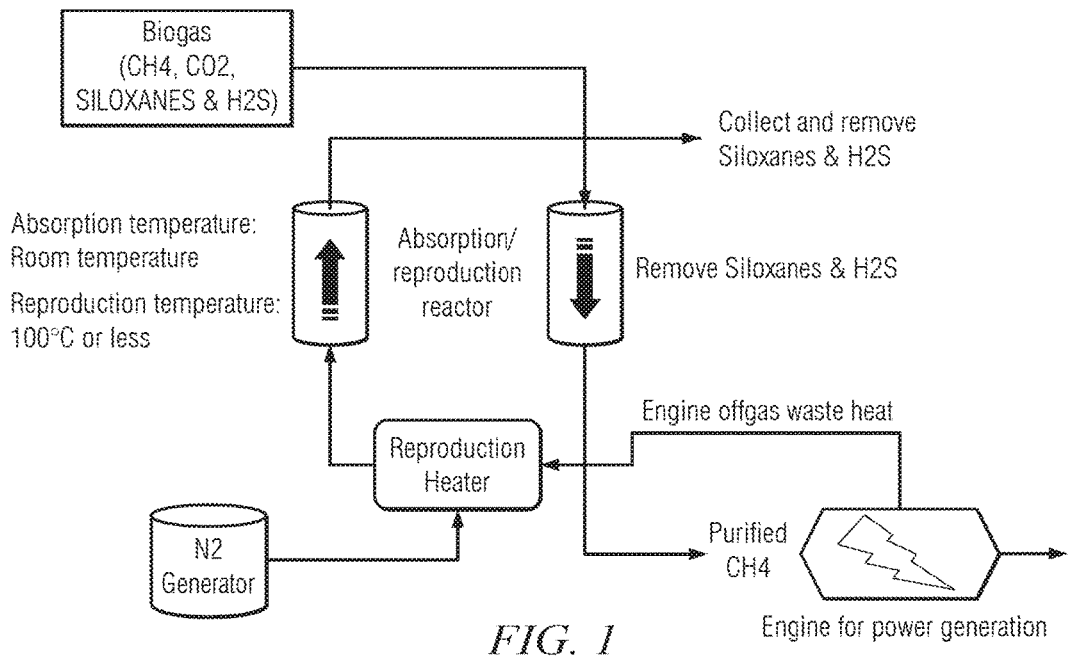
FIG. 1 is a schematic diagram illustrating a technique for removing siloxane in biogas.

Advantages and features of the present disclosure, and methods for accomplishing the same will be more clearly understood from exemplary embodiments described below with reference to the accompanying drawings. However, the present disclosure is not limited to the following exemplary embodiments but may be implemented in various different forms. The exemplary embodiments are provided only to complete disclosure of the present disclosure and to fully provide a person having ordinary skill in the art to which the present disclosure pertains with the category of the disclosure, and the present disclosure will be defined by the appended claims.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the present specification. Further, in the following description, a detailed explanation of known related technologies may be omitted to avoid unnecessarily obscuring the subject matter of the present disclosure. The terms such as "including," "having," and "consist of" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on", "above", "below", and "next", one or more parts may be positioned between the two parts unless the terms are used with the term "immediately" or "directly".

When an element or layer is referred to as being "on" another element or layer, it may be directly on the other element or layer, or intervening elements or layers may be present.

Although the terms "first", "second", and the like are used for describing various components, these components are not confined by these terms. These terms are merely used for distinguishing one component from the other components. Therefore, a first component to be mentioned below may be a second component in a technical concept of the present disclosure.

Throughout the whole specification, the same reference numerals denote the same elements.

Since size and thickness of each component illustrated in the drawings are represented for convenience in explanation, the present disclosure is not necessarily limited to the illustrated size and thickness of each component.

The features of various embodiments of the present disclosure can be partially or entirely bonded to or combined with each other and can be interlocked and operated in technically various ways, and the embodiments can be carried out independently of or in association with each other.

The present disclosure relates to a poly(meth)acrylate salt-based polymer absorbent for removing siloxane compounds in biogas, a method for removing siloxane compounds in biogas using the same, and a manufacturing apparatus therefor.

In the present disclosure, a poly(meth)acrylate salt-based polymeric material prepared through ion exchange of sodium poly(meth)acrylate is used as the absorbent of the siloxane compounds.

Hereinafter, the present disclosure will be described in more detail.

According to an exemplary embodiment of the present disclosure, the polymer absorbent uses a poly(meth)acrylate-based super absorbing polymeric material.

According to an exemplary embodiment of the present disclosure, the polymer absorbent is repetitively usable through a desorption reproduction process of the siloxane compounds.

According to an exemplary embodiment of the present disclosure, the polymer absorbent is prepared by ion exchange of sodium poly(meth)acrylate.

In the ion exchange, hygroscopic inorganic particles, such as metal chlorides such as LiCl, NaCl, KCl, $MgCl_2$, and $CaCl_2$, metal halides such as bromide or iodide are mixed with particles of sodium polyacrylate and the inorganic salt particles may be mixed between the sodium polyacrylate particles, and then sodium ions are exchanged to other cations by deliquescing the inorganic salt molecules by heating and humidifying to prepare the polymer absorbent.

According to an exemplary embodiment of the present disclosure, the polymer absorbent finally prepared through the ion exchange is supported in a porous honeycomb material.

According to an exemplary embodiment of the present disclosure, when the concentration of the siloxane compounds in the biogas is equal to or less than 200 ppm, a removal rate of siloxane is equal to or greater than 99%.

According to an exemplary embodiment of the present disclosure, a method for removing siloxane compounds in biogas includes steps of (a) providing biogas; and (b) passing the biogas through the polymer absorbent.

According to an exemplary embodiment of the present disclosure, the step (b) includes absorbing the siloxane compounds in the polymer absorbent in a temperature range of 15 to 30° C.

According to an exemplary embodiment of the present disclosure, the method further include desorbing the siloxane compounds absorbed in the polymer absorbent in a temperature range of 60 to 100° C., after the absorbing step.

According to an exemplary embodiment of the present disclosure, an apparatus for removing siloxane compounds in biogas performs a reproduction process by performing desorbing the polymer absorbent by using engine waste heat.

According to an exemplary embodiment of the present disclosure, the apparatus for removing the siloxane compounds in the biogas continuously operates by alternately absorbing and desorbing by constituting a siloxane compound absorbing unit as one or more multistage.

According to an exemplary embodiment of the present disclosure, the apparatus for removing the siloxane compounds in the biogas further includes one or more units selected from a water removing unit, a sulfur compound removing unit, a nitride oxide removing unit, a pressing unit, a decompressing unit, and a particle filter unit.

Next, Preparation Example and Examples of the present disclosure will be described. However, the following Preparation Example and Examples are to exemplify the present disclosure and the present disclosure is not limited to the following Preparation Example and Examples.

Preparation Example

A polymer absorbent according to the present disclosure used ion-exchanged poly(meth)acrylate salt which was known as a super absorbing polymer.

In order to prepare the polymer absorbent, sodium polyacrylate particles having an average diameter of 50 μm was used and mixed and added with lithium chloride particles having an average diameter of 30 μm with a weight ratio of 1:2 in a mixing chamber, and then deliquesced while being mixed well for 3 hr at a temperature of 60° C. in humidity of 100% to obtain an ion-exchanged deliquescent material. In addition, the ion-exchanged deliquescence was sufficiently dried in a dryer and grinded again to obtain particles of the ion-exchanged polyacrylate salt.

Next, the ion-exchanged polyacrylate salt was dissolved in distilled water at a concentration of 30 wt % and then coated on a polyethylene fiber nonwoven sheet having bent portions waved in a lateral direction and a thickness of 0.08 mm while flowing the deliquescence to manufacture a polymer absorbent product of the present disclosure. A coated thickness of the finally prepared polyacrylate salt is about 50 mm and about 44 g per 1 $m^2$ is coated.

Example 1

Absorption performance of silicagel which is known as an existing siloxane absorbent was compared with that of a reusable polymer absorbent according to the present disclosure prepared according to Preparation Example at room temperature (25° C.). A pollutant to be evaluated was used by preparing siloxane simulator gas in biogas by heating, at 100° C. and 1 atm, a liquid siloxane compound as decamethylcyclopentasiloxane (D5) represented by the following Chemical Formula (1).

[Chemical Formula 1]

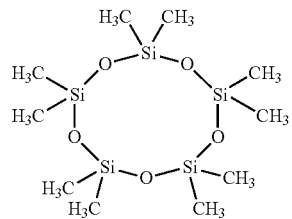

Decamethylcyclopentasiloxane

Figure 2:
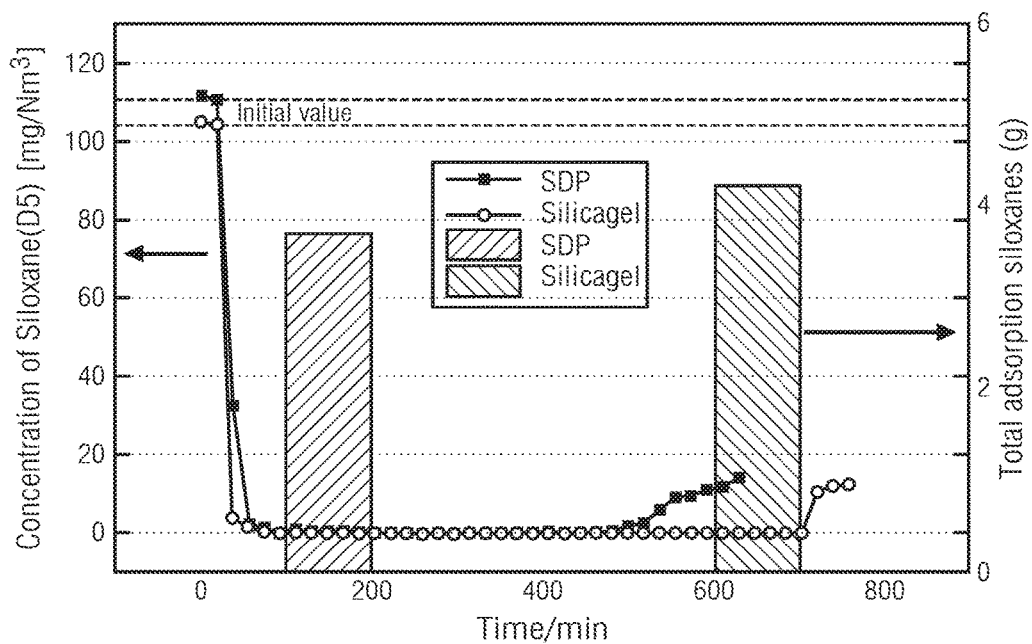
FIG. 2 is a graph illustrating a siloxane concentration and a total absorption amount over time.

Thereafter, as illustrated in FIG. 2, in the case of the reusable polymer absorbent, it was verified that the ability (absorption performance per unit weight) to remove the siloxane similar to silicagel was shown.

Example 2

Figure 3:
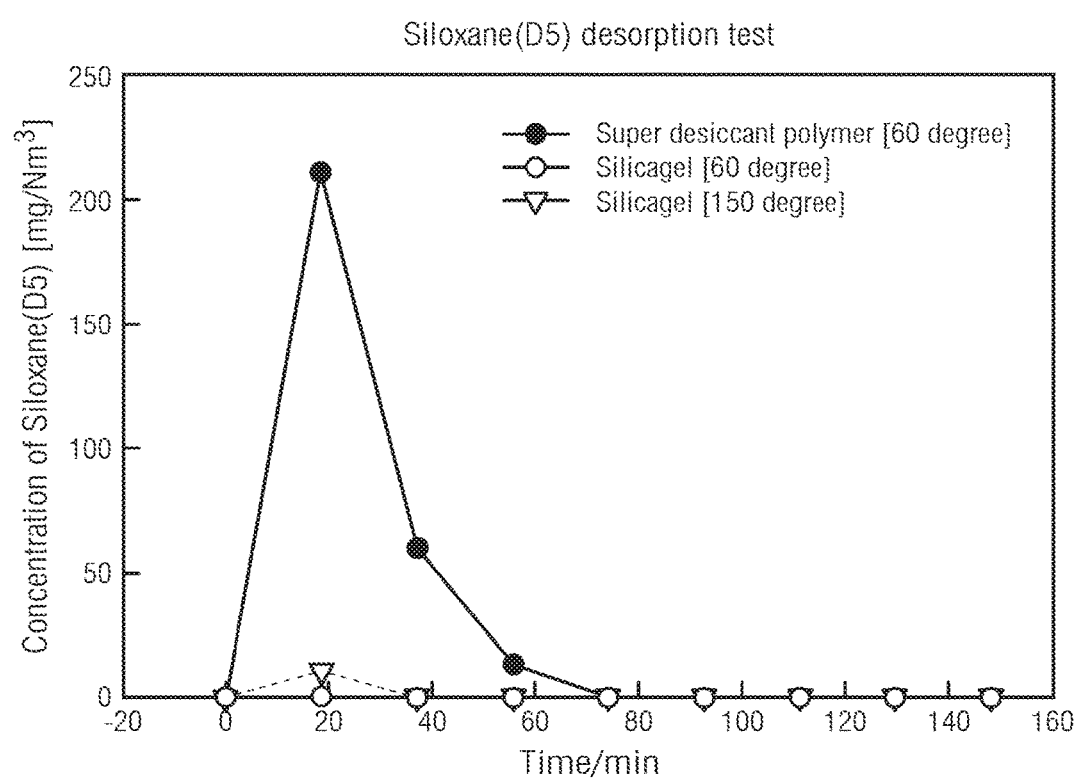
FIG. 3 is a graph illustrating desorption performance comparison of siloxane over time.

Desorption (reproduction) performance according a reproduction (heating) temperature of a reusable polymer absorbent at a low temperature according to the present disclosure was compared with that of silicagel known as an existing siloxane absorbent. As illustrated in FIG. 3, it was verified that the reusable polymer absorbent at the low temperature according to the present disclosure had excellent desorption performance to such an extent that the siloxane removal rate reached 99% even in the case where the desorption test was performed at a low temperature (60° C.) and in a nitrogen atmosphere of normal pressure while the absorbent layer was heated at 60° C. Accordingly, it can be seen that in the case of silicagel which is an absorption and desorption material for removing the existing siloxane compounds, even at 150° C., the desorption performance is almost not shown, but the reusable polymer absorbent according to the present disclosure has very excellent reproduction performance.

Although the exemplary embodiments of the present disclosure have been described in detail with reference to the accompanying drawings, the present disclosure is not limited thereto and may be embodied in many different forms without departing from the technical concept of the present disclosure. Therefore, the exemplary embodiments of the present disclosure are provided for illustrative purposes only but not intended to limit the technical concept of the present disclosure. The scope of the technical concept of the present disclosure is not limited thereto. Therefore, it should be understood that the above-described exemplary embodiments are illustrative in all aspects and do not limit the present invention. The protective scope of the present disclosure should be construed based on the following claims, and all the technical concepts in the equivalent scope thereof should be construed as falling within the scope of the present disclosure.

What is claimed is:

1. A polyacrylate-based polymer absorbent for removing siloxane compounds from biogas, comprising:
    particles of poly(meth)acrylate salt, cations of the salt being other than sodium;
    hygroscopic inorganic particles, anions of the inorganic particles selected from the group consisting of chloride, bromide and iodide, cations of the inorganic particles including sodium; and
    a porous support.

2. A method for removing siloxane compounds in biogas, the method comprising the steps of:
    (a) providing the biogas; and
    (b) absorbing siloxane compounds contained in the biogas in a polymer absorbent by passing the biogas through the polymer absorbent of claim 1.

3. The method of claim 2, wherein when the siloxane concentration in the biogas is equal to or less than 200 ppm, a siloxane removal rate is equal to or greater than 99%.

4. The method for removing siloxane compounds in biogas of claim 2, wherein the absorbing step (b) includes absorbing the siloxane compounds in the polymer absorbent in a temperature range of 15 to 30° C.

5. The method for removing siloxane compounds contained in biogas of claim 2, further comprising:
    desorbing the absorbed siloxane compounds so as to reproduce the polymer absorbent in a temperature range of 60 to 100° C. after the step (b) or in parallel with the step (b).

6. The method of claim 5, wherein the polymer absorbent is repetitively used by repetitively desorbing the absorbed siloxane compounds so as to reproduce the polymer absorbent.

7. An apparatus for removing siloxane compounds contained in biogas, the apparatus comprising:
    (i) a biogas providing unit; and
    (ii) one or more absorbing units including a polymer absorbent according to claim 1.

8. The apparatus for removing siloxane compounds in biogas of claim 7, wherein the absorbing units operate in an absorbing step in a temperature range of 15 to 30° C.

9. The apparatus for removing siloxane compounds in biogas of claim 7, wherein the absorbing units are constituted by two or more absorbing units.

10. The apparatus for removing siloxane compounds in biogas of claim 9, wherein at least one of the absorbing units operates in a step of desorbing the absorbed siloxane compounds in a temperature range of 60 to 100° C. in order to reproduce the polymer absorbent.

11. The apparatus for removing siloxane compounds in biogas of claim 10, wherein the absorbing unit operating in the desorbing step operates by using waste heat of an engine operating by biogas from which the siloxane compounds are removed.

12. The apparatus for removing siloxane compounds in biogas of claim 7, the apparatus further comprising:
    one or more units selected from a water removing unit, a sulfur compound removing unit, a nitride oxide removing unit, a pressing unit, a decompressing unit, and a particle filter unit.

13. A method for preparing a polyacrylate-based polymer absorbent for removing siloxane compounds in biogas, the method comprising the steps of:
    providing particles of sodium poly(meth)acrylate;
    mixing the sodium poly(meth)acrylate particles with hygroscopic inorganic particles to create a mixture, the hygroscopic inorganic particles having anions selected from the group consisting of chloride, bromide and iodide and having cations that are not sodium; and
    exchanging the sodium ions of the poly(meth)acrylate for the cations of the hygroscopic inorganic particles by deliquescing the mixture by heating and humidifying.

* * * * *